United States Patent
Jing

(10) Patent No.: US 12,153,601 B2
(45) Date of Patent: Nov. 26, 2024

(54) TRANSACTION REQUEST CONSTRUCTION METHOD AND APPARATUS, TRANSACTION REQUEST PROCESSING METHOD AND APPARATUS, DEVICE AND STORAGE MEDIUM

(71) Applicant: Beijing Baidu Netcom Science Technology Co., Ltd., Beijing (CN)

(72) Inventor: Bo Jing, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 423 days.

(21) Appl. No.: 17/548,680

(22) Filed: Dec. 13, 2021

(65) Prior Publication Data
US 2022/0100777 A1    Mar. 31, 2022

(30) Foreign Application Priority Data
Jan. 15, 2021    (CN) .......................... 202110055149.X

(51) Int. Cl.
  *G06F 16/27*    (2019.01)
  *G06F 9/46*    (2006.01)
  *H04L 9/32*    (2006.01)

(52) U.S. Cl.
  CPC .............. *G06F 16/27* (2019.01); *G06F 9/466* (2013.01); *H04L 9/3247* (2013.01)

(58) Field of Classification Search
  CPC ......... G06F 16/27; G06F 9/466; H04L 9/3247
  See application file for complete search history.

(56) References Cited

U.S. PATENT DOCUMENTS 11,093,651 B2 *  8/2021  Qiu ...................... H04L 9/3234
2019/0066119 A1   2/2019  Sengupta
(Continued)

FOREIGN PATENT DOCUMENTS

| AU | 2020103294 A4 | 1/2021 |
| CN | 108876370 A | 11/2018 |

(Continued)

OTHER PUBLICATIONS

Notice of Reasons for Refusal mailed Jan. 26, 2023 for Japanese Patent Application No. 2021-209721 (eight (8) pages).
(Continued)

*Primary Examiner* — Kambiz Zand
*Assistant Examiner* — Afaq Ali
(74) *Attorney, Agent, or Firm* — KDW Firm PLLC

(57) ABSTRACT

Provided are a transaction request construction method and apparatus, a transaction request processing method and apparatus, a device and a storage medium, which relate to the field of blockchain technology and can be used for cloud computing and cloud services. A specific implementation includes: generating a standard transaction request according to a standard key of a service application party, to-be-processed request data, a target blockchain architecture to be accessed and a target blockchain identifier; and calling a transaction conversion service and converting the standard transaction request into a target transaction request under the target blockchain architecture according to the standard key, the target blockchain architecture and the target blockchain identifier; where the target transaction request is used for processing the to-be-processed request data. Transaction request construction and processing efficiency can be improved.

16 Claims, 7 Drawing Sheets

—S110

Generate a standard transaction request according to a standard key of a service application party, to-be-processed request data, a target blockchain architecture to be accessed and a target blockchain identifier

—S120

Call a transaction conversion service and convert the standard transaction request into a target transaction request under the target blockchain architecture according to the standard key, the target blockchain architecture and the target blockchain identifier

(56) References Cited

U.S. PATENT DOCUMENTS

| | | | |
|---|---|---|---|
| 2020/0034334 A1* | 1/2020 | Lu | H04L 9/0637 |
| 2020/0177388 A1* | 6/2020 | Qiu | H04L 9/3236 |
| 2020/0349564 A1* | 11/2020 | Padmanabhan | H04L 63/123 |
| 2021/0051023 A1* | 2/2021 | Wei | H04L 9/3231 |
| 2022/0012731 A1* | 1/2022 | DeRosa-Grund | G06F 16/2365 |
| 2022/0179869 A1* | 6/2022 | Gaur | G06F 16/2343 |
| 2022/0239509 A1* | 7/2022 | Jang | G06F 21/602 |

FOREIGN PATENT DOCUMENTS

| | | |
|---|---|---|
| CN | 111459672 A | 7/2020 |
| CN | 111640020 A | 9/2020 |
| CN | 111737365 A | 10/2020 |
| CN | 111741026 A | 10/2020 |
| CN | 111769957 A | 10/2020 |
| CN | 111769958 A | 10/2020 |
| JP | 2018525729 A | 9/2018 |
| JP | 2020074559 A | 5/2020 |
| JP | 2020161092 A | 10/2020 |
| KR | 20190002688 A | 1/2019 |
| KR | 20190136364 A | 12/2019 |
| WO | 2008136764 A1 | 11/2008 |
| WO | 2020115002 A1 | 6/2020 |

OTHER PUBLICATIONS

Korean Office Action for Application No. 1020210175789 dated Jan. 31, 2024.

Ma, Xiao-ting et al, "A Cross Domain Authentication Scheme Based on Blockchain Technology," ACTA Electronica Sinica, vol. 46, No. 11, Nov. 2018.

Chinese Supplemental Search Report for Application No. 202110055149dated Aug. 16, 2023.

Liu Xiong-Wen, "System Solution of Multi-blockchain Transaction Dispatching and Event Handling," Computer Science, vol. 45. No. 11A, Nov. 2018.

Chinese Search Report for Application No. 202110055149X dated Jan. 15, 2021.

Chinese Office Action for Application No. 202110055149X dated Jun. 19, 2023.

\* cited by examiner

TRANSACTION REQUEST CONSTRUCTION METHOD AND APPARATUS, TRANSACTION REQUEST PROCESSING METHOD AND APPARATUS, DEVICE AND STORAGE MEDIUM

CROSS-REFERENCE TO RELATED APPLICATION(S)

This application claims the priority to Chinese Patent Application No. CN202110055149.X, filed on Jan. 15, 2021 and entitled "TRANSACTION REQUEST CONSTRUCTION METHOD AND APPARATUS, TRANSACTION REQUEST PROCESSING METHOD AND APPARATUS, DEVICE AND STORAGE MEDIUM", the disclosure of which is incorporated herein by reference in its entirety.

TECHNICAL FIELD

The present disclosure relates to the field of computer technology and, in particular, to the field of blockchain technology. Specifically, the present disclosure relates to a transaction request construction method and apparatus, a transaction request processing method and apparatus, a device and a storage medium.

BACKGROUND

With the development of blockchain technology, alliance networks have increasingly wide applications. An alliance network is generally constituted by an organization and maintained by multiple nodes in the same alliance. The alliance network may include at least one alliance chain, and multiple alliance chains may be parallel chains or have a subchain relationship. The organization may provide at least two heterogeneous blockchain network architectures. For example, some organization may provide XChain (a super chain), Ethereum and Fabric.

However, a service application party operates inconveniently in the process of using the heterogeneous blockchain network architectures due to constraints of different heterogeneous blockchain networks, which is an urgent problem to be solved.

SUMMARY

The present disclosure provides a transaction request construction method and apparatus, a transaction request processing method and apparatus, a device and a storage medium.

According to an aspect of the present disclosure, a transaction request construction method is provided. The method includes the steps below.

A standard transaction request is generated according to a standard key of a service application party, to-be-processed request data, a target blockchain architecture to be accessed and a target blockchain identifier.

A transaction conversion service is called and the standard transaction request is converted into a target transaction request under the target blockchain architecture according to the standard key, the target blockchain architecture and the target blockchain identifier.

The target transaction request is used for processing the to-be-processed request data.

According to another aspect of the present disclosure, a transaction request processing method is provided. The method includes the steps below.

A target transaction request under a target blockchain architecture is acquired, where the target transaction request is constructed using the transaction request construction method in any one of embodiments of the present application.

The target transaction request is sent to a target blockchain network according to the target blockchain architecture and a target blockchain identifier so that the target blockchain network processes to-be-processed request data.

According to another aspect of the present disclosure, a transaction request construction apparatus is provided. The apparatus includes a processor and a memory for storing execution instructions that when executed by the processor cause the processor to perform steps in a standard request generation module and a transaction request conversion module.

The standard request generation module is configured to generate a standard transaction request according to a standard key of a service application party, to-be-processed request data, a target blockchain architecture to be accessed and a target blockchain identifier.

The transaction request conversion module is configured to call a transaction conversion service and convert the standard transaction request into a target transaction request under the target blockchain architecture according to the standard key, the target blockchain architecture and the target blockchain identifier.

The target transaction request is used for processing the to-be-processed request data.

According to another aspect of the present disclosure, a transaction request processing apparatus is provided. The apparatus includes a processor and a memory for storing execution instructions that when executed by the processor cause the processor to perform steps in a target request acquisition module and a target request distribution module.

The target request acquisition module is configured to acquire a target transaction request under a target blockchain architecture, where the target transaction request is constructed by the transaction request construction apparatus in any one of embodiments of the present application.

The target request distribution module is configured to send the target transaction request to a target blockchain network according to the target blockchain architecture and a target blockchain identifier so that the target blockchain network processes to-be-processed request data.

According to a sixth aspect, a non-transitory computer-readable storage medium is provided. The storage medium stores a computer instruction configured to cause a computer to perform the transaction request construction method in any one of embodiments of the present application or the transaction request processing method in any one of embodiments of the present application.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure. In the drawings.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it is to be understood by those of ordinary skill in the art that various changes and modifications may be made to the embodiments described herein without departing from the scope and spirit of the present disclosure. Similarly, description of well-known functions and constructions is omitted hereinafter for clarity and conciseness.

Figure 1A:
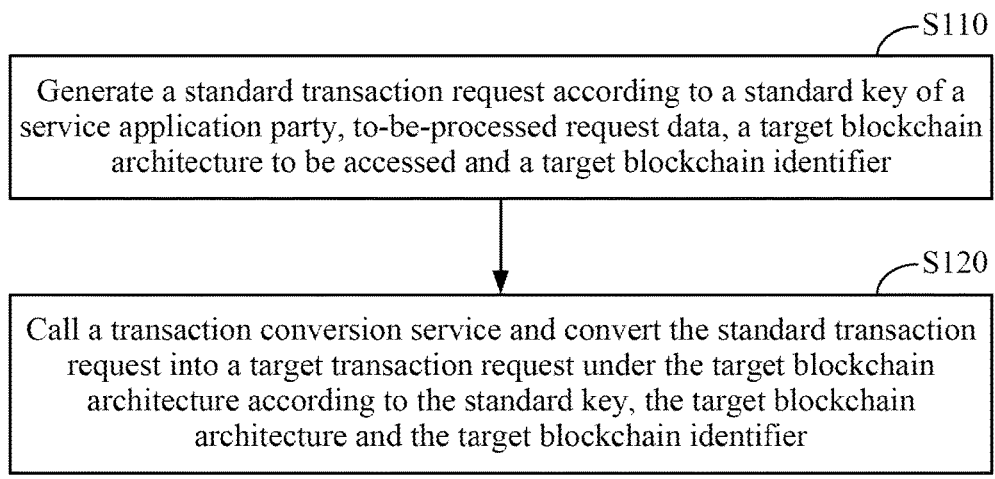
FIG. 1A is a flowchart of a transaction request construction method according to an embodiment of the present application.

FIG. 1A is a flowchart of a transaction request construction method according to an embodiment of the present application. This embodiment is applicable to the case where a transaction request is assembled for heterogeneous blockchain networks. The transaction request construction method according to this embodiment may be performed by an electronic device and may specifically be performed by a transaction request construction apparatus. The apparatus may be implemented by software and/or hardware and disposed in the electronic device. Referring to FIG. 1A, the transaction request construction method provided in this embodiment includes the steps below.

In S110, a standard transaction request is generated according to a standard key of a service application party, to-be-processed request data, a target blockchain architecture to be accessed and a target blockchain identifier.

In S120, a transaction conversion service is called and the standard transaction request is converted into a target transaction request under the target blockchain architecture according to the standard key, the target blockchain architecture and the target blockchain identifier.

The target transaction request is used for processing the to-be-processed request data.

In an embodiment of the present application, the service application party refers to a user of the heterogeneous blockchain networks, that is, a service party using the heterogeneous blockchain networks, for example, a financial service party such as a bank or a security. The service application party has a unified standard blockchain account system which may include a standard key and a standard account address of a standard blockchain account, and the standard key may include a standard private key and a standard public key.

The to-be-processed request data may be determined according to a service requirement and may include at least one of to-be-stored evidence data, to-be-queried data, a to-be-called smart contract, a function of a smart contract, or a parameter value of a smart contract. That is, the standard transaction request may be used for storing evidence data on a chain or performing an on-chain query and may also be used for calling the smart contract.

The service application party may use at least two heterogeneous blockchain network architectures provided by an organization as candidate blockchain architectures. One candidate blockchain architecture includes at least one candidate blockchain network, and each candidate blockchain network has a unique blockchain identifier. Moreover, according to the service requirement, the service application party may select at least one target blockchain architecture from the candidate blockchain architectures and select at least one target blockchain network from candidate blockchain networks belonging to the at least one target blockchain architecture to obtain the target blockchain identifier. For example, the service application party may use all the candidate blockchain architectures as the target blockchain architectures and all the candidate blockchain networks as the target blockchain networks.

In an embodiment of the present application, the transaction conversion service is used for converting a unified standard transaction request into a target transaction request suitable for a target blockchain. The transaction conversion service may be provided by a software development kit (SDK), an application programming interface (API) or the like.

Specifically, the service application party may determine the to-be-processed request data, the target blockchain architecture and the target blockchain identifier according to the service requirement and assemble the to-be-processed request data, the target blockchain architecture and the target blockchain identifier by using the standard key of the service application party to obtain the standard transaction request. It is to be noted that the standard transaction request is unique, that is, the standard transaction request is independent of the target blockchain architecture and the target blockchain identifier and only one standard transaction request may be generated for one service requirement. Moreover, the service application party may call the transaction conversion service and convert the standard transaction request into the target transaction request according to the standard key, the target blockchain architecture and the target blockchain identifier. Different target blockchain architectures are associated with different target transaction requests; different target blockchain networks belonging to the same target blockchain architecture may be associated with the same target transaction request or different target transaction requests.

Figure 1B:
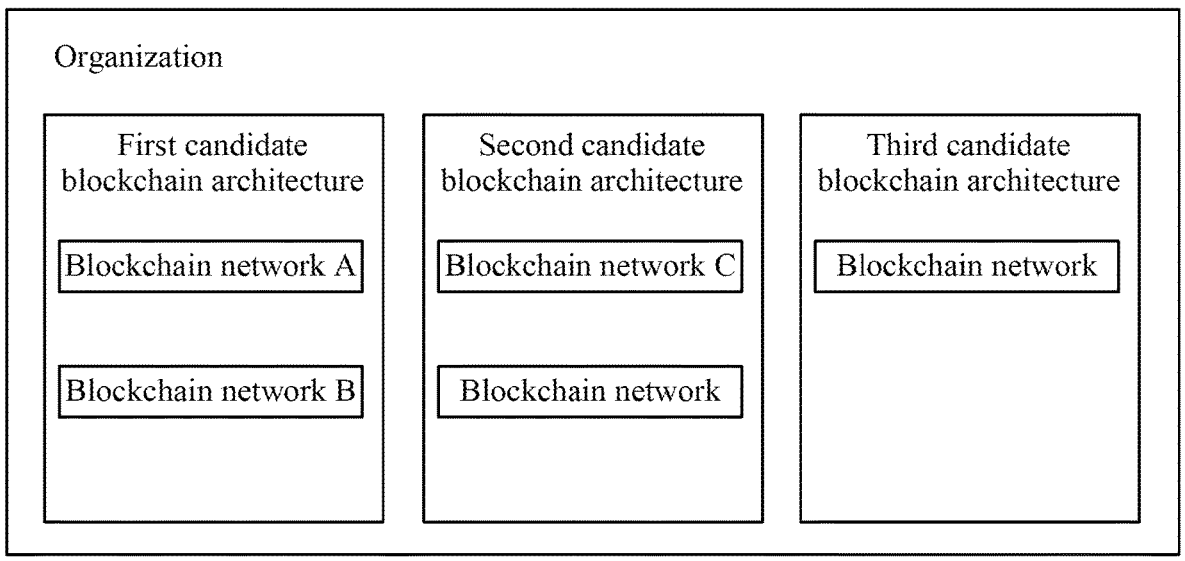
FIG. 1B is a schematic diagram of a transaction request construction process according to an embodiment of the present application.

FIG. 1B is a schematic diagram of a transaction request construction process according to an embodiment of the present application. Referring to FIG. 1B, the following example is used: there are three candidate blockchain architectures and the service application party uses a first candidate blockchain architecture and a second candidate blockchain architecture as the target blockchain architectures and uses a blockchain network A and a blockchain network B in the first candidate blockchain architecture and a blockchain network C in the second candidate blockchain architecture as the target blockchain networks. The service application party generates the standard transaction request using the standard key, calls the transaction conversion service, and converts the standard transaction request into a target transaction request A for the blockchain network A, a target transaction request B for the blockchain network B and a target transaction request C for the blockchain network C, separately.

The service application party generates the unified standard transaction request by using the standard key and converts the unified standard transaction request into target transaction requests adapted to different target blockchain architectures and different target blockchains by calling the transaction conversion service so that a transaction request initiator (for example, a user of the service application party) only needs to record and use the unified standard key for constructing the standard transaction request instead of respectively recording and using different account keys for artificially constructing different target transaction requests for blockchain architectures, which can simplify operations of the transaction request initiator, improve transaction request construction efficiency, and thus improve transaction request processing efficiency.

In an optional embodiment, before the standard transaction request is generated according to the standard key of the service application party, the to-be-processed request data, the target blockchain architecture to be accessed and the target blockchain identifier, the method further includes: acquiring standard mnemonic information of the service application party; and determining the standard key of the service application party according to the standard mnemonic information.

The standard mnemonic information may be content easy to be memorized, such as characters and numbers. The user of the service application party may have unique standard mnemonic information. Specifically, the standard mnemonic information may be acquired which is provided by the user of the service application party in the process of constructing the transaction request, and the standard key may be derived from the standard mnemonic information based on a standard account system. The user of the service application party may initiate the standard transaction request by simply using the standard mnemonic information, that is, the user of the service application party only needs to memorize standard mnemonics instead of memorizing the standard key and the standard account address, thereby further simplifying operations of the service application party.

Additionally, after the target transaction request is constructed, the target transaction request may be transmitted to the target blockchain network of the organization through a lightweight node and the to-be-processed request data in the target transaction request may be processed by the target blockchain network, for example, the target blockchain network may provide storage on a chain and a query.

According to the technical solution provided in the embodiment of the present application, the service application party uses a unified standard account system under multiple blockchain architectures instead of using different blockchain accounts for different blockchain architectures, respectively so that the service application party does not need to consider data structures of transaction requests in the blockchain architectures, which can simplify the operations of the transaction request initiator, improve the transaction request construction efficiency, and thus improve the transaction request processing efficiency and achieve a good balance between flexibility and universality.

Figure 2:
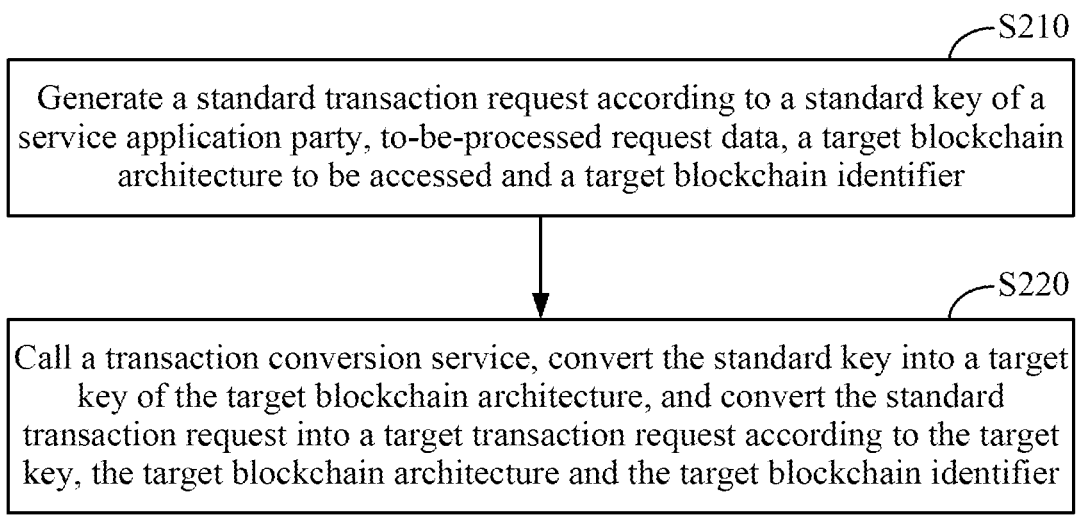
FIG. 2 is a flowchart of another transaction request construction method according to an embodiment of the present application.

FIG. 2 is a flowchart of another transaction request construction method according to an embodiment of the present application. This embodiment is an optional solution provided based on the preceding embodiment. Referring to FIG. 2, the transaction request construction method provided in this embodiment includes the steps below.

In S210, a standard transaction request is generated according to a standard key of a service application party, to-be-processed request data, a target blockchain architecture to be accessed and a target blockchain identifier.

In S220, a transaction conversion service is called, the standard key is converted into a target key of the target blockchain architecture, and the standard transaction request is converted into a target transaction request according to the target key, the target blockchain architecture and the target blockchain identifier.

The target transaction request is used for processing the to-be-processed request data.

In an embodiment of the present application, for each target blockchain architecture, a target account system of the target blockchain architecture may be different from a standard account system. Specifically, the transaction conversion service is called and the standard key may be converted into the target key of the target blockchain architecture in the following manner: a standard private key is converted into an integer whose length is greater than a preset value; the standard private key is matched to an elliptic curve specified to be used for the target blockchain architecture so that a target private key is obtained, for example, an elliptic curve used by a Fabric architecture may be an elliptic curve over a prime field, an elliptic curve used by an Ethereum architecture may be a standard efficient cryptographic curve, and an elliptic curve used by XChain may be an SM2 elliptic curve; a target public key is calculated according to the elliptic curve used by the target blockchain architecture in conjunction with the target private key; and a blockchain account address of the target blockchain architecture is generated according to an address generation algorithm used by the target blockchain architecture. That is, a target private key, a target public key and a target account address in a target blockchain account system are obtained. A unified standard account system may be automatically converted into the target account system of the target blockchain architecture through an account conversion subservice in the transaction conversion service so that the service application party can memorize only the standard account system, which simplifies operations of the service application party.

Moreover, a transaction conversion subservice in the transaction conversion service may be called, data structure conversion may be performed on the standard transaction request according to a data structure of the target transaction request under the target blockchain architecture, and a data structure conversion result of the standard transaction request may be signed according to the target key and the target blockchain identifier so that the target transaction request is obtained. The data structure conversion is performed on the standard transaction request so that the service application party does not need to consider a data structure of a transaction request in an underlying blockchain network, which further simplifies the operations of the service application party.

In an optional embodiment, the step in which the standard transaction request is converted into the target transaction request according to the target key, the target blockchain architecture and the target blockchain identifier includes: supplementing the to-be-processed request data in the standard transaction request according to the target blockchain architecture to obtain target request data; determining a signature algorithm of a target blockchain according to the target blockchain identifier; and signing the target request data using the target key based on the signature algorithm to obtain the target transaction request.

For different blockchain architectures, different fields need to be supplemented in the standard transaction request. For example, at least one of the following fields may be supplemented: a permission addition field, a smart contract description addition field, a consensus mechanism addition field or the like. The transaction conversion service may be preconfigured with fields to be added for transaction requests under different candidate blockchain architectures relative to the standard transaction request and supplement a field in the standard transaction request accordingly. It is to be noted that some fields in the standard transaction request may be adjusted according to a relationship between the target account system of the target blockchain architecture and the standard account system, for example, an account address and a signature of a request initiator are adjusted.

Specifically, the to-be-processed request data in the standard transaction request may be converted into the target request data so that a new transaction request is obtained; and the signature algorithm of the target blockchain is determined according to the target blockchain identifier, and the new transaction request is signed using the target key based on the signature algorithm of the target blockchain so that the target transaction request is obtained, thereby completing the assembly of the target transaction request. The number of target transaction requests may be the same as the number of target blockchain networks which may belong to different target blockchain architectures. The standard account system of the service application party is converted into a target account system of a target blockchain network and a data structure of the standard transaction request is converted into a data structure of the target blockchain architecture so that the service application party is supported to simultaneously use multiple blockchain architectures through the unified standard account system.

According to the technical solution provided in the embodiment of the present application, the service application party may call the transaction conversion service and convert the standard transaction request generated using the unified standard account system into different target transaction requests adapted to different target blockchain networks, which can simplify operations of a transaction request initiator, improve transaction request construction efficiency, and thus improve transaction request processing efficiency.

Figure 3A:
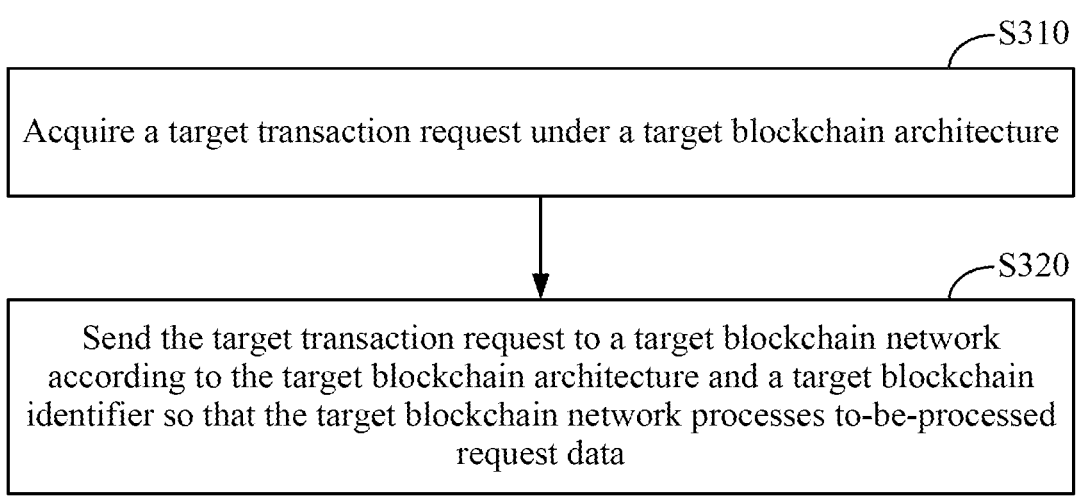
FIG. 3A is a flowchart of a transaction request processing method according to an embodiment of the present application.

FIG. 3A is a flowchart of a transaction request processing method according to an embodiment of the present application. This embodiment is applicable to the case where transaction requests are processed by heterogeneous blockchain networks. The transaction request processing method according to this embodiment may be performed by an electronic device and may specifically be performed by a transaction request processing apparatus. The apparatus may be implemented by software and/or hardware and disposed in the electronic device. Referring to FIG. 3A, the transaction request processing method provided in this embodiment includes the steps below.

In S310, a target transaction request under a target blockchain architecture is acquired.

The target transaction request may be constructed using the transaction request construction method provided in any one of embodiments of the present application. For example, the target transaction request is constructed in the following manner: a standard transaction request is generated according to a standard key of a service application party, to-be-processed request data, the target blockchain architecture to be accessed and a target blockchain identifier; and a transaction conversion service is called and the standard transaction request is converted into the target transaction request under the target blockchain architecture according to the standard key, the target blockchain architecture and the target blockchain identifier.

In S320, the target transaction request is sent to a target blockchain network according to the target blockchain architecture and the target blockchain identifier so that the target blockchain network processes the to-be-processed request data.

Specifically, the service application party may generate the standard transaction request using a standard blockchain account system based on a data structure of the standard transaction request. Moreover, the service application party may call the transaction conversion service and convert the standard transaction request into the target transaction request adapted to an account system and a data structure of the target blockchain architecture. Different target blockchain architectures and different target blockchains may have their own target transaction requests, and the number of target transaction requests may be the same as the number of target blockchain networks.

After calling the transaction conversion service and constructing the target transaction request for the target blockchain architecture, the service application party may provide the target transaction request for a lightweight node. The lightweight node may be configured with an organization to be connected and send the target transaction request to an alliance blockchain network system in the organization for execution, that is, the lightweight node may serve as a sender of the target transaction request. The alliance blockchain network system may include different candidate blockchain architectures, and one candidate blockchain architecture may include different candidate blockchain networks.

Specifically, the alliance blockchain network system in the organization may send the target transaction request to the target blockchain network according to the target blockchain architecture and the target blockchain identifier and process the target transaction request through the target blockchain network. For example, the organization may send the target transaction request to the target blockchain architecture and further send the target transaction request to the target blockchain network through the target blockchain architecture.

In an optional embodiment, the step in which the target transaction request is sent to the target blockchain network according to the target blockchain architecture and the target blockchain identifier includes the steps below. The target transaction request is sent to a transaction gateway for the target blockchain architecture according to the target blockchain architecture. The transaction gateway for the target blockchain architecture sends the target transaction request to the target blockchain network according to the target blockchain identifier.

In an optional embodiment, an operation of sending the target transaction request to the transaction gateway for the target blockchain architecture may be performed by an organization distribution gateway of the organization to which the sender of the target transaction request belongs.

The organization may have a unified organization distribution gateway and each candidate blockchain architecture has its own transaction gateway. The organization distribution gateway is configured to send the target transaction request to a target transaction gateway corresponding to the target blockchain architecture according to the target blockchain architecture to which the target transaction request belongs. The target transaction gateway is configured to send the target transaction request to the target blockchain network corresponding to the target blockchain identifier according to the target blockchain identifier to which the target transaction request belongs.

Figure 3B:
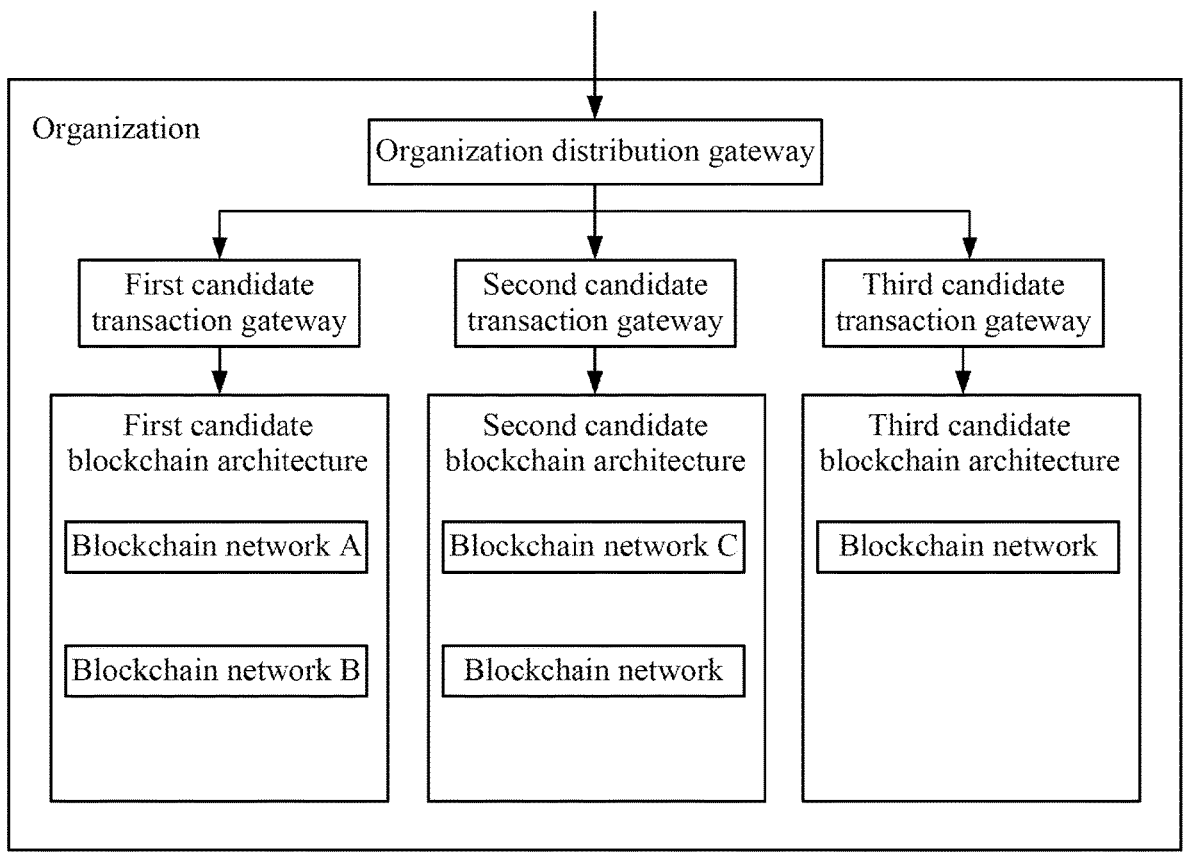
FIG. 3B is a structural diagram of heterogeneous blockchain networks in an organization according to an embodiment of the present application.

FIG. 3B is a structural diagram of heterogeneous blockchain networks in an organization according to an embodiment of the present application. Referring to FIG. 3B, still using three candidate blockchain architectures as an example, the organization may be deployed with the unified organization distribution gateway and a first candidate transaction gateway, a second candidate transaction gateway and a third candidate transaction gateway corresponding to a first candidate blockchain architecture, a second candidate blockchain architecture and a third candidate blockchain architecture, respectively. The following example is still used: the target blockchain architectures are the first candidate blockchain architecture and the second candidate blockchain architecture, and the target blockchain networks are a blockchain network A and a blockchain network B in the first candidate blockchain architecture and a blockchain network C in the second candidate blockchain architecture. After acquiring the target transaction requests of the target blockchain networks, the organization distribution gateway of the organization sends target transaction requests belonging to the first candidate blockchain architecture to the first candidate transaction gateway and sends a target transaction request belonging to the second candidate blockchain architecture to the second candidate transaction gateway; the first candidate transaction gateway sends a target transaction request belonging to the blockchain network A to the blockchain network A and sends a target transaction request belonging to the blockchain network B to the blockchain network B; and the second candidate transaction gateway sends a target transaction request belonging to the blockchain network C to the blockchain network C. The unified organization distribution gateway is configured for the organization and different transaction gateways are configured for different blockchain architectures, which can improve transmission efficiency and accuracy of the target transaction request and thus improve processing efficiency of the target transaction request.

According to the technical solution provided in the embodiment of the present application, the unified organization distribution gateway is configured for the organization and different transaction gateways are configured for different blockchain architectures, which can improve the transmission efficiency and accuracy of the target transaction request and thus improve the processing efficiency of the target transaction request.

Figure 4:
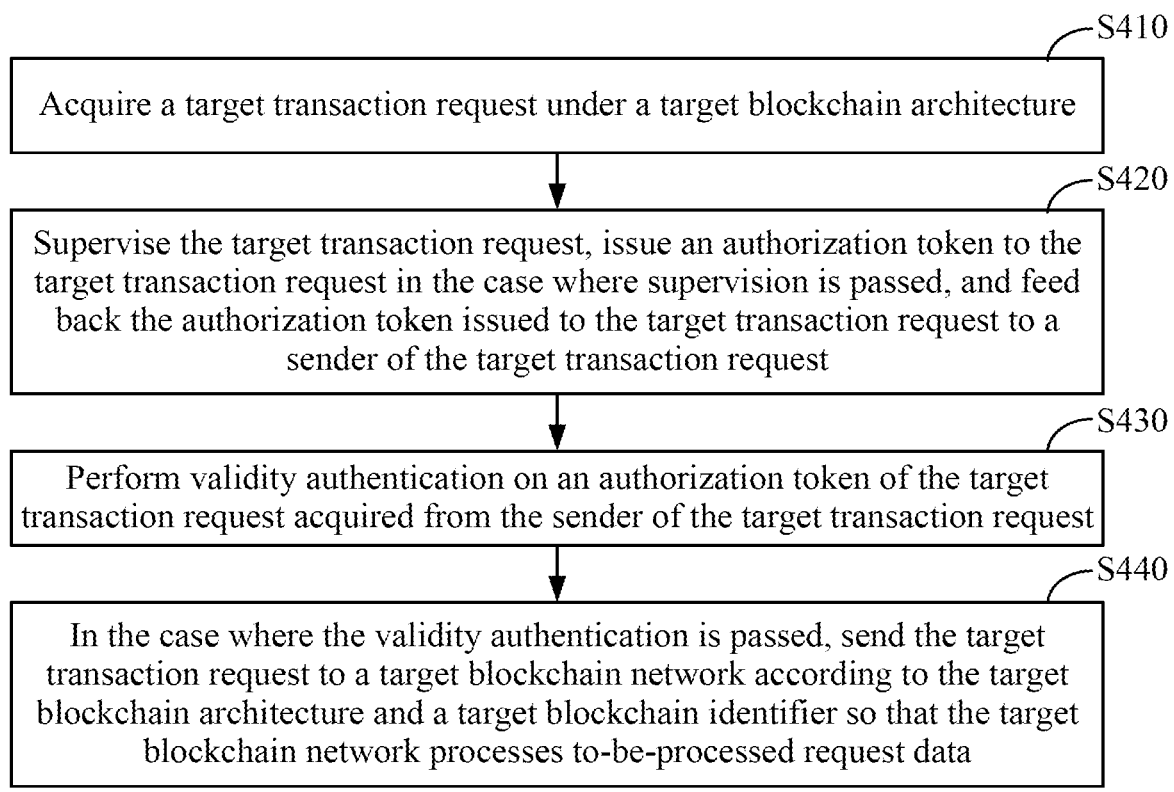
FIG. 4 is a flowchart of another transaction request processing method according to an embodiment of the present application.

FIG. 4 is a flowchart of another transaction request processing method according to an embodiment of the present application. This embodiment is an optional solution provided based on the preceding embodiment. Referring to FIG. 4, the transaction request processing method provided in this embodiment includes the steps below.

In S410, a target transaction request under a target blockchain architecture is acquired.

The target transaction request may be constructed using the transaction request construction method provided in any one of embodiments of the present application.

In S420, the target transaction request is supervised, an authorization token is issued to the target transaction request in the case where supervision is passed, and the authorization token issued to the target transaction request is fed back to a sender of the target transaction request.

In S430, validity authentication is performed on an authorization token of the target transaction request acquired from the sender of the target transaction request.

In S440, in the case where the validity authentication is passed, the target transaction request is sent to a target blockchain network according to the target blockchain architecture and a target blockchain identifier so that the target blockchain network processes to-be-processed request data.

A supervision mechanism for the target transaction request is introduced so that the target transaction request can be controlled in terms of data compliance, access permission and the like, and a target transaction request that is not compliant or has no access permission is shielded. That is, the authorization token is not issued to the target transaction request that has not passed the supervision, thereby further improving flexibility and processing efficiency of the target transaction request.

An operation of supervising the target transaction request is performed by a supervision node of an organization to which the sender of the target transaction request belongs; and an operation of performing the validity authentication on the authorization token of the target transaction request is performed by a validity control layer of the organization.

In the organization, the supervision node supervises the target transaction request, shields the target transaction request that has not passed the supervision, and issues the authorization token only to the target transaction request that has passed the supervision; and the validity control layer performs the validity authentication on the authorization token of the target transaction request, shields the target transaction request with no authorization token or an invalid authorization token, and performs subsequent processing only on the target transaction request that has passed the validity authentication. The supervision node and the validity control layer are decoupled so that the separation of a user of the supervision node and a user of the validity control layer is supported, which can improve system stability and efficiency of concurrent processing of target transaction requests.

In an optional embodiment, the step in which the target transaction request is supervised includes: performing sensitivity detection on the target transaction request based on a sensitivity supervision policy.

The sensitivity supervision policy is used for detecting whether the target transaction request has illegal sensitive data. The sensitivity supervision policy may be updated. The target transaction request including sensitive data can be identified and shielded through the sensitivity supervision policy, so as to avoid an adverse effect caused by the propagation of sensitive data.

In an optional embodiment, the step in which the target transaction request is supervised includes: performing permission detection on the target transaction request based on a permission management policy.

The permission management policy is used for determining whether a transaction request initiator has request permission. Specifically, it may be determined whether an identity of a service application party that initiates a transaction request complies with requirements, for example, whether the transaction request is initiated by a user with a particular identity (a user whose identity is a manager) of the service application party. Processing flexibility of the target transaction request can be improved through the permission management policy.

When the target transaction request is an evidence storage transaction request, the target blockchain network executes the target transaction request to write to-be-stored evidence into a target blockchain. When the target transaction request is a query transaction request, the target blockchain network obtains a query result through a query on the target blockchain and may return the query result to a blockchain browser. The blockchain browser aggregates query results returned by different target blockchain networks and displays an aggregation result to an initiator of a standard transaction request, that is, a user of the service application party. The blockchain browser may be configured in a lightweight node.

According to the technical solution provided in the embodiment of the present application, the target transaction request is supervised and the validity authentication is performed on the authorization token issued to the target transaction request, which can further improve flexibility and processing efficiency of the target transaction request.

Figure 5:
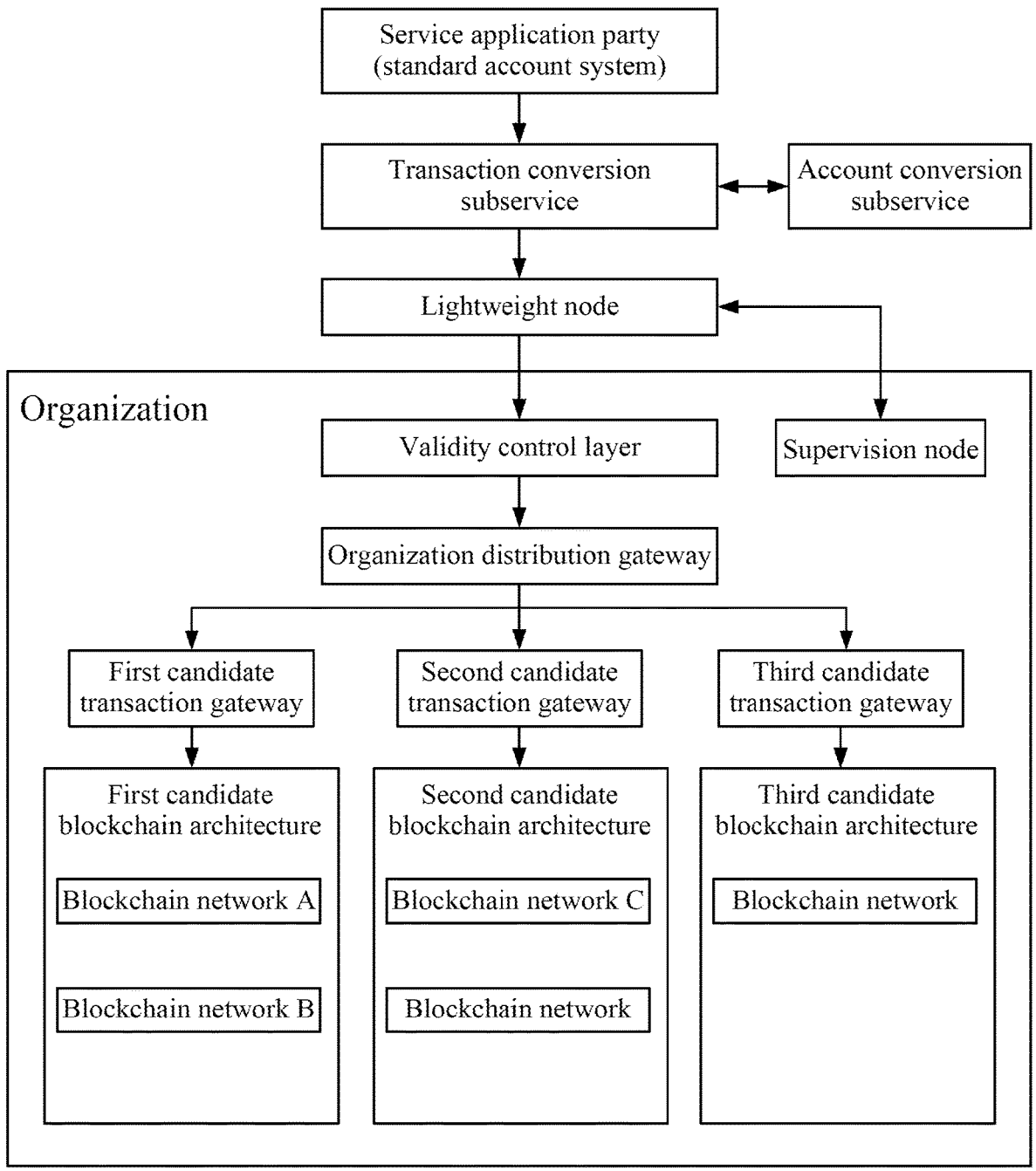
FIG. 5 is a logical schematic diagram of processing on heterogeneous blockchain networks according to an embodiment of the present application.

FIG. 5 is a logical schematic diagram of processing on heterogeneous blockchain networks according to an embodiment of the present application. Referring to FIG. 5, the processing on the heterogeneous blockchain networks provided in this embodiment may include a transaction request construction stage and a transaction request processing stage.

In the transaction request construction stage, a service application party assembles a standard transaction request using a standard account system, calls a transaction conversion service, and converts the standard transaction request into different target transaction requests adapted to different target blockchains.

Specifically, 1.1 the service application party assembles a standard transaction, where the standard transaction may include a standard private key, to-be-processed request data, a to-be-called smart contract, a function of the smart contract, a parameter value of the smart contract, at least one target blockchain architecture to be accessed and at least one target blockchain name to be accessed.

1.2 The service application party calls an account conversion subservice to convert the standard account system of the service application party into a target account system of a target blockchain architecture to obtain a target private key, a target account address and a target public key; the service application party also calls a transaction conversion subservice, supplements the to-be-processed request data in the standard transaction request according to the target blockchain architecture to obtain target request data, and signs the target request data using the target private key based on a signature algorithm of a target blockchain to obtain a target transaction request, so as to complete assembly of the target transaction request.

In the transaction request processing stage, the service application party may provide the target transaction requests for a lightweight node which serves as an interface, and a heterogeneous alliance blockchain system in an organization processes the target transaction requests.

Specifically, 2.1 the lightweight node acquires the assembled target transaction request, and a supervision node (also referred to as a supervision plug-in node) in the organization supervises and authorizes the target transaction request. For example, the supervision node detects whether an account address of an initiator of the target transaction request has permission and whether the target transaction request includes sensitive data and determines that detection is passed if the account address has the permission and the target transaction request includes no sensitive data. The supervision node may issue an authorization token to the target transaction request and return the authorization token of the target transaction request to the lightweight node.

2.2 The lightweight node requests a validity control layer in the organization to perform validity authentication on an authorization token of the target transaction request. If authentication is passed, the target transaction request may be transmitted to an organization distribution gateway in the organization.

2.3 The organization distribution gateway sends the target transaction request to a transaction gateway for the target blockchain architecture according to the target blockchain architecture, for example, sends the target transaction requests to a first candidate transaction gateway and a second candidate transaction gateway. A target transaction gateway sends the target transaction request to a target blockchain network under the target blockchain architecture according to a target blockchain identifier, for example, the first candidate transaction gateway sends target transaction requests to a blockchain network A and a blockchain network B and the second candidate transaction gateway sends a target transaction request to a blockchain network C so that the target blockchain network executes the target transaction request.

Specifically, when the target transaction request is an on-chain evidence storage transaction request, the target blockchain network writes evidence storage data into the target blockchain. When the target transaction request is a query transaction request, each target blockchain network obtains a query result and returns the query result to the lightweight node, and the lightweight node aggregates and presents query results to the service application party.

According to the technical solution provided in the embodiment of the present application, the standard account system can be supported to be used in multiple heterogeneous networks, and the service application party does not need to maintain a blockchain account for each heterogeneous network; the service application party does not need to consider a data structure of a deal in an underlying blockchain network; and the standard account system is supported to be used for access to multiple heterogeneous networks in a blockchain browser, and query results of the heterogeneous networks are aggregated and presented to a user. Compared with the use of blockchain browsers for different heterogeneous networks, the present application can reduce the number of queries performed by the service application party.

Figure 6:
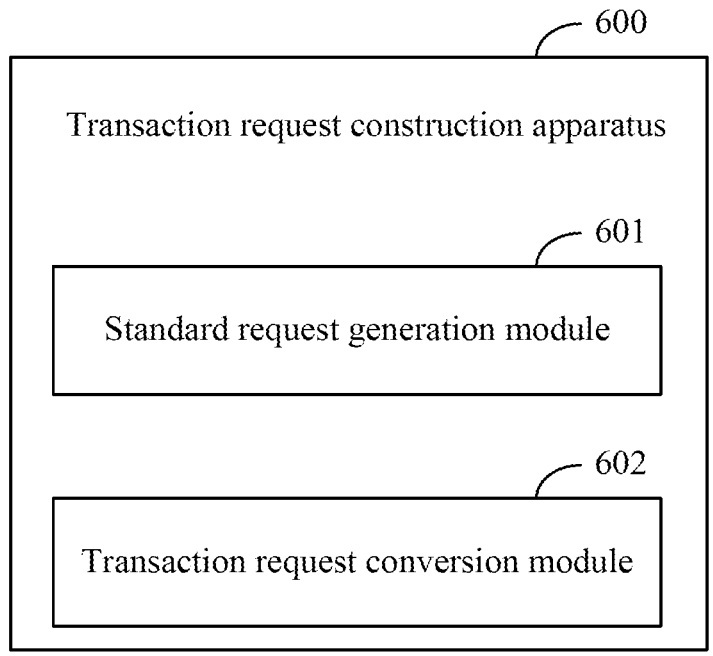
FIG. 6 is a structural diagram of a transaction request construction apparatus according to an embodiment of the present application.

FIG. 6 is a structural diagram of a transaction request construction apparatus according to an embodiment of the present application. Referring to FIG. 6, a transaction request construction apparatus 600 provided in the embodiment of the present application may include a standard request generation module 601 and a transaction request conversion module 602.

The standard request generation module 601 is configured to generate a standard transaction request according to a standard key of a service application party, to-be-processed request data, a target blockchain architecture to be accessed and a target blockchain identifier.

The transaction request conversion module 602 is configured to call a transaction conversion service and convert the standard transaction request into a target transaction request under the target blockchain architecture according to the standard key, the target blockchain architecture and the target blockchain identifier.

The target transaction request is used for processing the to-be-processed request data.

In an optional embodiment, the transaction request conversion module 602 is configured to perform the operations below.

The transaction conversion service is called, the standard key is converted into a target key of the target blockchain architecture, and the standard transaction request is converted into the target transaction request according to the target key, the target blockchain architecture and the target blockchain identifier.

In an optional embodiment, the transaction request conversion module 602 is configured to perform the operations below.

The to-be-processed request data in the standard transaction request is supplemented according to the target blockchain architecture so that target request data is obtained.

A signature algorithm of a target blockchain is determined according to the target blockchain identifier.

The target request data is signed using the target key based on the signature algorithm so that the target transaction request is obtained.

In an optional embodiment, the transaction request construction apparatus 600 further includes a standard key determination module. The standard key determination module includes a mnemonic acquisition unit and a standard key determination unit.

The mnemonic acquisition unit is configured to acquire standard mnemonic information of the service application party.

The standard key determination unit is configured to determine the standard key of the service application party according to the standard mnemonic information.

According to the technical solution provided in the embodiment of the present application, the service application party uses a unified standard account system under multiple blockchain architectures instead of using different blockchain accounts for different blockchain architectures, respectively, which can simplify operations of a transaction request initiator, improve transaction request construction efficiency, and thus improve transaction request processing efficiency and achieve a good balance between flexibility and universality.

Figure 7:
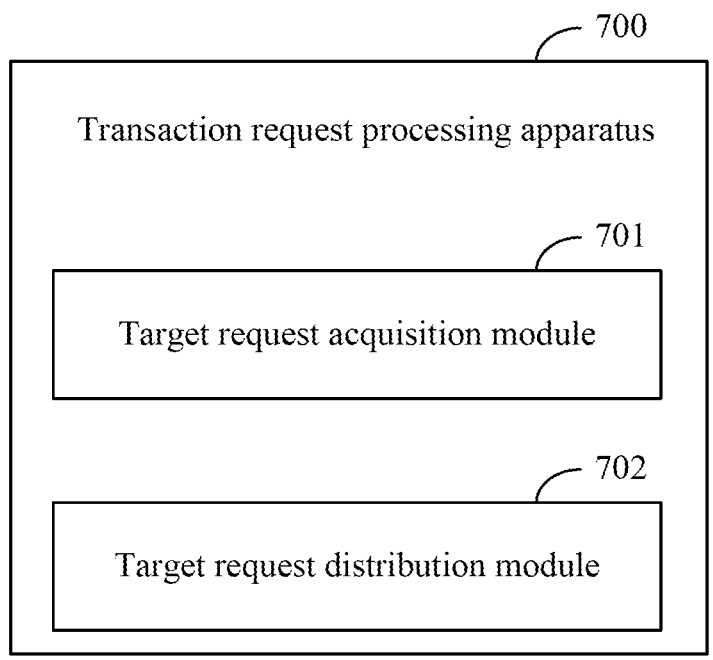
FIG. 7 is a structural diagram of a transaction request processing apparatus according to an embodiment of the present application.

FIG. 7 is a structural diagram of a transaction request processing apparatus according to an embodiment of the present application. Referring to FIG. 7, a transaction request processing apparatus 700 provided in the embodiment of the present application may include a target request acquisition module 701 and a target request distribution module 702.

The target request acquisition module 701 is configured to acquire a target transaction request under a target blockchain architecture, where the target transaction request is constructed by the above transaction request construction apparatus.

The target request distribution module 702 is configured to send the target transaction request to a target blockchain network according to the target blockchain architecture and a target blockchain identifier so that the target blockchain network processes to-be-processed request data.

In an optional embodiment, the target request distribution module 702 includes a first distribution unit and a second distribution unit.

The first distribution unit is configured to send the target transaction request to a transaction gateway for the target blockchain architecture according to the target blockchain architecture.

The second distribution unit is configured to cause the transaction gateway for the target blockchain architecture to send the target transaction request to the target blockchain network according to the target blockchain identifier.

In an optional embodiment, an operation of sending the target transaction request to the transaction gateway for the target blockchain architecture is performed by an organization distribution gateway of an organization to which a sender of the target transaction request belongs.

In an optional embodiment, the transaction request processing apparatus 700 further includes a request supervision module and a request authentication module.

The request supervision module is configured to supervise the target transaction request, issue an authorization token to the target transaction request in the case where supervision is passed, and feed back the authorization token issued to the target transaction request to the sender of the target transaction request.

The request authentication module is configured to perform validity authentication on an authorization token of the target transaction request acquired from the sender of the target transaction request and trigger an operation of sending the target transaction request to the transaction gateway in the case where the validity authentication is passed.

In an optional embodiment, the request supervision module is configured to perform at least one of the operations below.

Sensitivity detection is performed on the target transaction request based on a sensitivity supervision policy.

Permission detection is performed on the target transaction request based on a permission management policy.

In an optional embodiment, an operation of supervising the target transaction request is performed by a supervision node of the organization to which the sender of the target transaction request belongs; and an operation of performing the validity authentication on the authorization token of the target transaction request is performed by a validity control layer of the organization.

According to the technical solution in the embodiment of the present application, a unified organization distribution gateway is configured for the organization and different transaction gateways are configured for different blockchain architectures, which can improve transmission efficiency and accuracy of the target transaction request and thus improve processing efficiency of the target transaction request.

According to embodiments of the present disclosure, the present disclosure further provides an electronic device, a readable storage medium and a computer program product.

Figure 8:
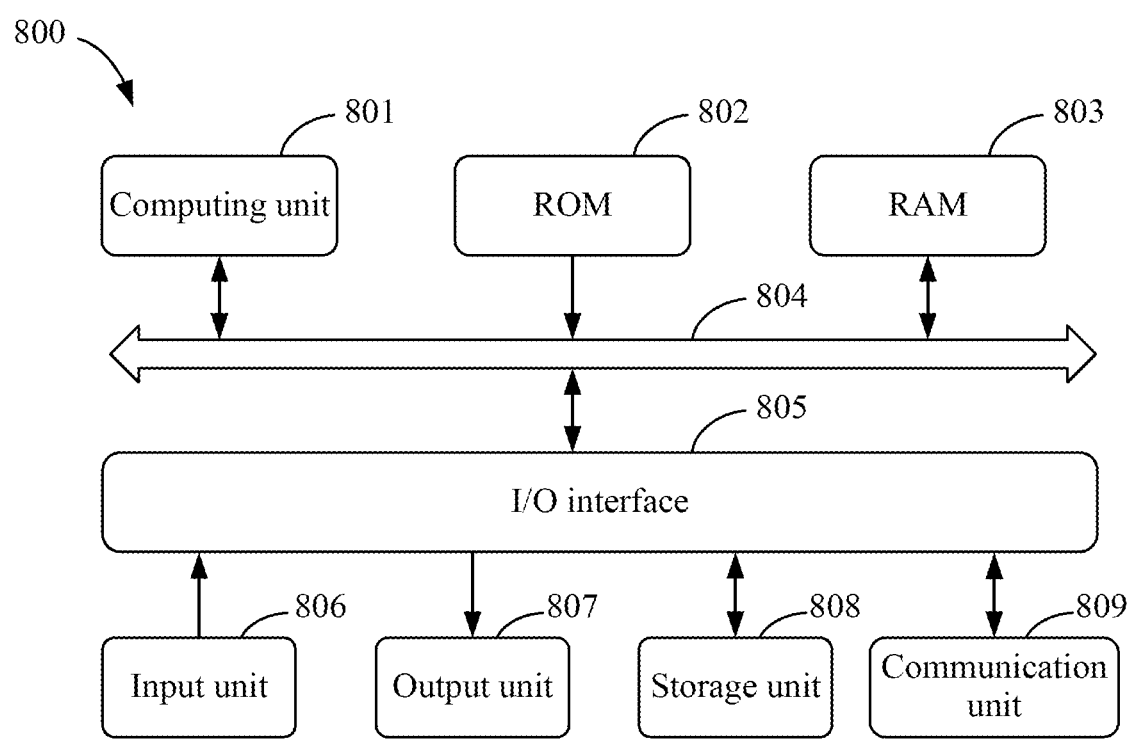
FIG. 8 is a block diagram of an electronic device for implementing a transaction request construction method or a transaction request processing method according to an embodiment of the present application.

FIG. 8 is a block diagram illustrative of an exemplary electronic device 800 that may be used for implementing embodiments of the present disclosure. Electronic devices are intended to represent various forms of digital computers, for example, laptop computers, desktop computers, worktables, personal digital assistants, servers, blade servers, mainframe computers and other applicable computers. Electronic devices may also represent various forms of mobile devices, for example, personal digital assistants, cellphones, smartphones, wearable devices and other similar computing devices. Herein the shown components, the connections and relationships between these components and the functions of these components are illustrative only and are not intended to limit the implementation of the present disclosure as described and/or claimed herein.

As shown in FIG. 8, the device 800 includes a computing unit 801. The computing unit 802 may perform various appropriate actions and processing according to a computer program stored in a read-only memory (ROM) 802 or a computer program loaded into a random-access memory (RAM) 803 from a storage unit 808. Various programs and data required for operations of the device 800 may also be stored in the RAM 803. The computing unit 801, the ROM 802 and the RAM 803 are connected to each other through a bus 804. An input/output (I/O) interface 805 is also connected to the bus 804.

Multiple components in the device 800 are connected to the I/O interface 805. The multiple components include an input unit 806 such as a keyboard and a mouse, an output unit 807 such as various types of displays and speakers, the storage unit 808 such as a magnetic disk and an optical disk, and a communication unit 809 such as a network card, a modem and a wireless communication transceiver. The communication unit 809 allows the device 800 to exchange information/data with other devices over a computer network such as the Internet and/or over various telecommunication networks.

The computing unit 801 may be a general-purpose and/or special-purpose processing component having processing and computing capabilities. Examples of the computing unit 801 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller and microcontroller. The computing unit 801 performs various preceding methods and processing, such as a transaction request construction method or a transaction request processing method. For example, in some embodiments, the transaction request construction method or the transaction request processing method may be implemented as a computer software program tangibly contained in a machine-readable medium such as the storage unit 808. In some embodiments, part or all of computer programs may be loaded and/or installed on the device 800 via the ROM 802 and/or the communication unit 809. When the computer program is loaded onto the RAM 803 and executed by the computing unit 801, one or more steps of the preceding transaction request construction method or transaction request processing method may be performed. Alternatively, in other embodiments, the computing unit 801 may be configured, in any other suitable manner (for example, by means of firmware), to perform the transaction request construction method or the transaction request processing method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting data and instructions to the memory system, the at least one input device and the at least one output device.

Program codes for implementation of the methods of the present disclosure may be written in any combination of one or more programming languages. These program codes may be provided for the processor or controller of a general-purpose computer, a special-purpose computer or another programmable data processing device to enable functions/operations specified in a flowchart and/or a block diagram to be implemented when the program codes are executed by the processor or controller. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that contains or stores a program available for an instruction execution system, apparatus or device or a program used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user; and a keyboard and a pointing device (for example, a mouse or a trackball) through which the user can provide input for the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in the service of a related physical host and a related virtual private server (VPS).

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, sub-combinations and substitutions may be made depending on design requirements and other factors. Any modifications, equivalent substitutions, improvements and the like made within the spirit and principle of the present disclosure are within the scope of the present disclosure.

What is claimed is:

1. A transaction request construction method, comprising:
   generating a standard transaction request according to a standard key of a service application party, to-be-processed request data, a target blockchain architecture to be accessed and a target blockchain identifier; and
   calling a transaction conversion service and converting the standard transaction request into a target transaction request under the target blockchain architecture according to the standard key, the target blockchain architecture and the target blockchain identifier;
   wherein the target transaction request is used for processing the to-be-processed request data;
   wherein calling the transaction conversion service and converting the standard transaction request into the target transaction request under the target blockchain architecture according to the standard key, the target blockchain architecture and the target blockchain identifier comprise:
      calling the transaction conversion service, converting the standard key into a target key of the target blockchain architecture;
      according to the target blockchain architecture, supplementing the to-be-processed request data in the standard transaction request to obtain target request data;
      determining a signature algorithm of a target blockchain according to the target blockchain identifier; and
      based on the signature algorithm, signing the target request data using the target key to obtain the target transaction request.

2. The method of claim 1, before generating the standard transaction request according to the standard key of the service application party, the to-be-processed request data, the target blockchain architecture to be accessed and the target blockchain identifier, further comprising:
   acquiring standard mnemonic information of the service application party; and
   determining the standard key of the service application party according to the standard mnemonic information.

3. A transaction request processing method, comprising:
   acquiring a target transaction request under a target blockchain architecture, wherein the target transaction request is constructed using the transaction request construction method of clam 1; and
   according to the target blockchain architecture and the target blockchain identifier, sending the target transaction request to a target blockchain network so that the target blockchain network processes to-be-processed request data.

4. The method of claim 3, wherein sending the target transaction request to the target blockchain network according to the target blockchain architecture and the target blockchain identifier comprises:
   sending the target transaction request to a transaction gateway for the target blockchain architecture according to the target blockchain architecture; and
   sending, by the transaction gateway for the target blockchain architecture, the target transaction request to the target blockchain network according to the target blockchain identifier.

5. The method of claim 4, wherein an operation of sending the target transaction request to the transaction gateway for the target blockchain architecture is performed by an organization distribution gateway of an organization to which a sender of the target transaction request belongs.

6. The method of claim 4, before sending the target transaction request to the transaction gateway for the target blockchain architecture according to the target blockchain architecture, further comprising:
   supervising the target transaction request, issuing an authorization token to the target transaction request in a case where supervision is passed, and feeding back the authorization token issued to the target transaction request to a sender of the target transaction request; and
   performing validity authentication on an authorization token of the target transaction request acquired from the sender of the target transaction request, and triggering an operation of sending the target transaction request to the transaction gateway in a case where the validity authentication is passed.

7. The method of claim 6, wherein supervising the target transaction request comprises at least one of:
   performing sensitivity detection on the target transaction request based on a sensitivity supervision policy; or
   performing permission detection on the target transaction request based on a permission management policy.

8. The method of claim 6, wherein an operation of supervising the target transaction request is performed by a supervision node of an organization to which the sender of the target transaction request belongs; and an operation of performing the validity authentication on the authorization token of the target transaction request is performed by a validity control layer of the organization.

9. A transaction request construction apparatus, comprising a processor and a memory for storing execution instructions that when executed by the processor cause the processor to perform steps in the following modules:
   a standard request generation module configured to generate a standard transaction request according to a standard key of a service application party, to-be-processed request data, a target blockchain architecture to be accessed and a target blockchain identifier; and
   a transaction request conversion module configured to call a transaction conversion service and convert the standard transaction request into a target transaction request under the target blockchain architecture according to the standard key, the target blockchain architecture and the target blockchain identifier;

wherein the target transaction request is used for processing the to-be-processed request data;

wherein the transaction request conversion module is configured to: call the transaction conversion service, convert the standard key into a target key of the target blockchain architecture, supplement the to-be-processed request data in the standard transaction request according to the target blockchain architecture to obtain target request data; determine a signature algorithm of a target blockchain according to the target blockchain identifier; and based on the signature algorithm, sign the target request data using the target key to obtain the target transaction request.

10. The apparatus of claim 9, further comprising a standard key determination module, wherein the standard key determination module comprises:

a mnemonic acquisition unit configured to acquire standard mnemonic information of the service application party; and a standard key determination unit configured to determine the standard key of the service application party according to the standard mnemonic information.

11. A transaction request processing apparatus, comprising a processor and a memory for storing execution instructions that when executed by the processor cause the processor to perform the transaction request processing method of claim 3.

12. The apparatus of claim 11, wherein the step of sending the target transaction request to the target blockchain network according to the target blockchain architecture and the target blockchain identifier in the transaction request processing method of claim 5 comprises:

sending the target transaction request to a transaction gateway for the target blockchain architecture according to the target blockchain architecture; and causing the transaction gateway for the target blockchain architecture to send the target transaction request to the target blockchain network according to the target blockchain identifier.

13. The apparatus of claim 12, wherein an operation of sending the target transaction request to the transaction gateway for the target blockchain architecture is performed by an organization distribution gateway of an organization to which a sender of the target transaction request belongs.

14. The apparatus of claim 11, the execution instructions that when executed by the processor further cause the processor to perform the following steps:

supervising the target transaction request, issue an authorization token to the target transaction request in a case where supervision is passed, and feed back the authorization token issued to the target transaction request to a sender of the target transaction request; and performing validity authentication on an authorization token of the target transaction request acquired from the sender of the target transaction request and trigger an operation of sending the target transaction request to a transaction gateway in a case where the validity authentication is passed.

15. The apparatus of claim 14, wherein supervising the target transaction request comprises at least one of:

performing sensitivity detection on the target transaction request based on a sensitivity supervision policy; or performing permission detection on the target transaction request based on a permission management policy.

16. A non-transitory computer-readable storage medium storing a computer instruction configured to cause a computer to perform the transaction request construction method of claim 1.

* * * * *